US010773461B2

(12) United States Patent
McDonald et al.

(10) Patent No.: US 10,773,461 B2
(45) Date of Patent: Sep. 15, 2020

(54) MAGNETIC PLASTIC INDUCTION

(71) Applicants: Iain Grant Kirk McDonald, Asheville, NC (US); Stuart Joseph Benjamin, Candler, NC (US)

(72) Inventors: Iain Grant Kirk McDonald, Asheville, NC (US); Stuart Joseph Benjamin, Candler, NC (US)

(*) Notice: Subject to any disclaimer, the term of this patent is extended or adjusted under 35 U.S.C. 154(b) by 413 days.

(21) Appl. No.: 15/602,233

(22) Filed: May 23, 2017

(65) Prior Publication Data
US 2017/0334145 A1    Nov. 23, 2017

Related U.S. Application Data

(60) Provisional application No. 62/340,092, filed on May 23, 2016.

(51) Int. Cl.
*B29C 65/02* (2006.01)
*B29C 65/48* (2006.01)
(Continued)

(52) U.S. Cl.
CPC .............. *B29C 65/02* (2013.01); *B29C 45/00* (2013.01); *B29C 65/368* (2013.01); *B29C 65/489* (2013.01); *B29C 65/4815* (2013.01); *B29C 65/4855* (2013.01); *B29C 66/91411* (2013.01); *B29C 66/91651* (2013.01); *B29C 66/949* (2013.01)

(58) Field of Classification Search
CPC ... B29C 65/02; B29C 65/489; B29C 65/4815; B29C 65/4855; B29C 65/368; B29C 45/00; B29C 66/949; B29C 66/91651; B29C 66/91411

USPC ......................................................... 264/429
See application file for complete search history.

(56) References Cited

U.S. PATENT DOCUMENTS 5,448,553 A * 9/1995 Suzuki ................ B29C 45/0013
720/722
5,958,283 A * 9/1999 Schmid .................... H01F 1/083
252/62.54
(Continued)

FOREIGN PATENT DOCUMENTS

JP           03270201 A * 12/1991

OTHER PUBLICATIONS

Miyao et al., JP H03-270201, machine translation, Dec. 2, 1991 (Year: 1991).*
(Continued)

*Primary Examiner* — Galen H Hauth
(74) *Attorney, Agent, or Firm* — Ware, Fressola, Maguire & Barber LLP (57) ABSTRACT

A plastic product having magnetic properties and a method for making the same is provided. The method comprises creating a mixture of a nylon and a metal, melting the mixture to create a melted mixture of the metal suspended in the nylon, injecting the melted mixture into a mold to harden the melted mixture and shape the melted mixture into the product's shape, applying an electrical current to the mold while the mixture is in a viscous state to align the poles of the metal suspended in the nylon in the mixture in a single direction before the mixture has hardened, and applying a magnetic field to the hardened mixture to provide the product with magnetic properties.

12 Claims, 9 Drawing Sheets

(51) Int. Cl.
  *B29C 65/36*  (2006.01)
  *B29C 65/00*  (2006.01)
  *B29C 45/00*  (2006.01)

(56) References Cited

U.S. PATENT DOCUMENTS

| | | | |
|---|---|---|---|
| 6,476,113 B1 * | 11/2002 | Hiles | B29C 45/0013 |
| | | | 524/439 |
| 6,642,341 B1 * | 11/2003 | Spitler | C08G 18/08 |
| | | | 264/435 |
| 9,135,897 B2 | 9/2015 | McDonald et al. | |
| 2004/0084795 A1 * | 5/2004 | Hornsby | B01J 3/008 |
| | | | 264/41 |
| 2012/0205534 A1 * | 8/2012 | Hunter | H01J 49/0013 |
| | | | 250/282 |
| 2013/0278367 A1 * | 10/2013 | Yoshida | H01F 7/02 |
| | | | 335/302 |
| 2015/0075352 A1 * | 3/2015 | McDonald | G10D 3/163 |
| | | | 84/322 |

OTHER PUBLICATIONS

A. Shah et al., "Comparison of the flow in co-rotating and counter-rotating twin-screw extruders", Mechanical Engineering-Engineering Mechanics Department, Michigan Technological University, 2004 (pp. 443-447).
"No. 5—Twin-Screw Extrusion", Plastics Technology, Oct. 2005, http://www.ptonline.com/articles/no-5—twin-screw-extrusion (3 pages).
"Plastics extrusion", www.en.wikipedia.org/wiki/Plastics_extrusion (7 pages).
"Nylon", www.en.wikipedia.org/wiki/Nylon (11 pages).
"Direct current", www.en.wikipedia.org/wiki/Direct_current (5 pages).
"Barium", www.en.wikipedia.org/wiki/Barium (8 pages).

\* cited by examiner

MAGNETIC PLASTIC INDUCTION

CROSS-REFERENCE TO RELATED APPLICATIONS

The present application claims the benefit of U.S. Provisional Patent Application No. 62/340,092 filed on May 23, 2016, which is hereby incorporated by reference in its entirety.

FIELD OF THE INVENTION

The present invention relates to a process and a machine for manufacturing a brand new composition of a "magnetic plastic" material. It involves sending milliamps of a wattage by limiting a variable current of voltage with a direct current (DC) transformer through a plastic injection machine tool mold, while simultaneously injecting liquid hot plastic that is infused with barium ferrite (BaFe) nanoparticles into a mold, thus aligning the poles of the particles in one direction using electromagnetism. This is classified as Faraday's Laws of Magnetic Induction and is applying BCS (Bardeen-Cooper Schrieffer) Theory of Coopers Pairs where the forces of electrons join together.

BACKGROUND OF THE INVENTION

As described in applicant's U.S. Pat. No. 9,135,897 for a "Magnetic Guitar Pick Ring and Material for Use Therewith," a plastic guitar pick with magnetic properties that can retract back to a ring worn on the finger of a strumming hand was developed. In certain embodiments, the plastic could have BaFe nanoparticles infused inside it. U.S. Pat. No. 9,135,897 is hereby incorporated by reference in its entirety.

The process for creating the plastic having magnetic properties according to the prior art is called "Injection Molded Magnets." The process involves embedding two magnets into the injection machine tool mold by machining in the magnets, which is a very expensive and time consuming process. There is one magnet with a north pole and one magnet with a south pole in each side of the mold, thus creating a magnetic field. However, the early production of "Injection Molded Magnets" consisted of hard, dense, and heavy resins and polymers. They needed to use large ratios of strontium ferrite (SrFe) and BaFe to make the material magnetic, thus making the resulting material brittle and heavy. An analysis of the material indicates that carbon and many types of metals are present in varying concentrations, including boron (84 mg/Kg of the material), barium (442 mg/Kg), iron (151,000 mg/Kg), titanium (49 mg/Kg) and strontium (30,200 mg/Kg). However, this material also contains a significant amount of other filler materials. The uses for these "magnetic polymers" are limited to internal mechanical components, and have very few uses in the mainstream marketplace.

Figure 1:
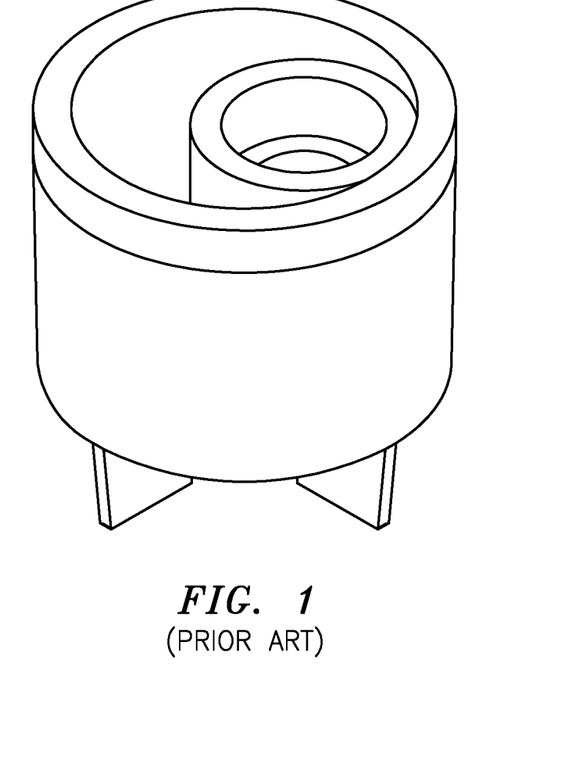
FIG. 1 shows a material created in accordance with the prior art.

FIG. 1 shows a sample product made using the "injection molded magnets" method according to the prior art. FIG. 1 shows coupling pieces, including a smaller piece that fits inside a larger housing piece and is attached magnetically to the larger housing. If one moves the smaller piece inside the magnetic resistance can be felt. However, these pieces are quite heavy, dense and brittle, and are not very "plastic" like.

Additionally, the extrusion process of making nano-infused plastic pellets for injection machines was infrequently conducted in the United States because the components or the custom metallic alloy particles like BaFe used in the injection process were exclusively produced in Asia. The process was too expensive, and that is why it was basically abandoned, and then subsequently became an underdeveloped technology.

SUMMARY OF THE INVENTION

In accordance with the present invention, a brand new, cheaper, and easier way to manufacture products made of 'Magnetic Plastic', solely by the means of electromagnetic induction, is provided. The applications of use for the present invention are numerous. The magnetic plastic material according to the present invention could not only be used to attract other items of the same material and metal, it could also be used to repel products away from one another.

The present invention addresses the shortcomings of the prior art. From a technical point of view, the induction process of the present invention makes the product being produced more magnetic in total. In the old way of "injection molded magnets", because the magnetic field is always present, the nanoparticles inside are pulled to one side of the product. In the induction process of the present invention, BCS Theory is applied and Coopers Pairs join the forces of electrons and move the nanoparticles together at one time, and only for a brief period of time. This leaves the plastic with a more evenly dispersed suspension of those nanoparticles, and gives it a more consistent Gauss number and more constant BH Curve. The old way of "injection molded magnets" does not produce a fully charged product. Also, the "injection molded magnet" method used such a high ratio of nanoparticles that the product became very heavy and brittle, and could not be considered a flexible plastic. With the present invention, the need to purchase high strength magnets separately for every mold, and then having a machinist bore and embed them precisely inside the molds, is no longer needed. This results in a reduction in the cost of manufacturing, thereby increasing the flexibility in the manufacturing of the material and its demand.

In order to have an optimally engineered substance or custom compounded polymer pellet for magnetic plastic, a narrow window of specific requirements must be met in order to make the plastic "flexible" and "magnetic". These characteristics generally oppose themselves. For optimal transfer of magnetic strength, the atoms of iron or steel are touching one another, not insulated from one another. Nylons have strong insulating properties, and the electrical conductivity of nylons can be $10^{-12}$ S/m. To have "flexible" plastic, a molecular crystalline bond takes place on an atomic level and is formed by reacting difunctional monomers containing equal parts of amine and carboxylic acid. To have the desired bonding of the molecules or stoichiometry, a repeating unit consists of monomers alternating in a symmetrical chain. Nylons have repeatable and symmetrical chains of monomers, and as will be shown, will eventually assist in the cohesion and dispersal of electromagnetic charged particulates in the "induction" process.

Even though there are many moving parts to the production of the magnetic plastic product of the present invention, one must first start with the polymer pellets used in all plastic products, as with few exceptions, nothing can be magnetized unless it has some form of metal that is magnetic inside. The ingredients of what goes in the plastic are not merely mixed into the hopper of the injection machine. The ingredients of fibers, powders and metal particles mixed into all polymers are created in a totally different process, not in just another machine. In fact, the manufacturing of pellets generally takes place at a completely different facility all together. This process is called the extrusion process. The ingredients for a custom compound are mixed into the extrusion machine, which may have a hopper and a screw. This is a very large industrial machine, as it forces the nylon into thin tubes like the wires that hang over sections of an old-fashioned clothesline. Then, this tubing is fed into a chopper that makes small hardened "BB" sized pellets. These pellets are then shipped to the injection plant to be used in all things plastic.

Nylon was the first commercially used and successful synthetic thermoplastic polymer, and because of its unique crystalline structure, can be mixed with a wide variety of additives to achieve many different property variations. Nylon is an ideal polymer for use in the present invention because of its ability to mix well with other substances and a large amount of additive or filler materials. When 30% of SrFe or BaFe is added to nylon, it changes the molecular structure. As used herein, 30% of SrFe, BaFe or other metallic compound refers to the percentage by mass of the metallic compound in the mixture including a nylon or other plastic, and may also be understood as corresponding to approximately 1.49 grams of metal per cubic centimeter of plastic. The term polyphthalamide is used when 60% or more moles of the carboxylic acid portion of the "repeating unit" in the polymer chain is composed of a combination of terephthalic and isophthalic acids. The ratio of filler added in the present invention reclassifies this polymer. Typically, combustion of crude oil takes place inside metal pistons of a machine. The process of the present invention is actually doing the opposite. Instead of taking oils and putting them inside metal machinery, metallic particles in the form of magnetically charged hyper-nanoparticles are put inside oil, or nylon. This creates a substance that has the rigidity and magnetic properties of metal, but which gravity cannot affect the same way.

Mixing nylons to make copolymers lowers the crystallinity and the melting point. A pure monomer chain is an ideal medium for magnetic plastic. Random reactions can take place by mixing two polymers in transamidation. Uniformity in amorphous regions that alternate with lamellar crystals is desired. The amorphous regions contribute elasticity and the crystalline regions contribute strength and rigidity. Nylons often have high crystallinity because of their regular and symmetrical backbone. The present invention uses nylon 6, some of the most commonly used nylon. Nylon 610 may be used because of its flexibility, but also nylon 66 because it has multiple parallel strands aligned with their neighboring peptide bonds at coordinated separations of exactly six and four carbons for considerable lengths, so the carbonyl oxygens and amide hydrogens can line up to form interchain hydrogen bonds repeatedly, without interruption. This is significant because it allows an avenue for Faraday's laws of magnetic induction to take place. It allows electromagnetic energy to pass uninterrupted through plastic, generating a magnetic field between each suspended particle. Nylons are hygroscopic and will absorb moisture, which aids in the "induction" process inside nylon. When dry, polyamide is a very strong electrical insulator. Dried nylon is not preferable for use in making magnetic plastic of the present invention. Nylon can be used as the matrix material in composite materials, with reinforcing fibers like glass or carbon fiber. However, the chain of monomers would be disrupted if double compounded. Magnetic plastic would therefore have to be a homogeneous blend of nylon. Nylon can be mixed into compounds and compounds can be mixed into nylon. The mixture ratio would determine what could be considered primarily a "nylon" or a "compound." The present invention seeks a specific blend of BaFe or SrFe to be mixed with pure nylon to be extruded into pellets for use in plastic injection machines, and the ratio is more a nylon than a compound.

In order to make magnetic plastic pellets, the ingredients must be mixed thoroughly and properly. In order to lock the monomers together so they can be flexible but have enough magnetic filler inside, they must also be dispersed evenly and symmetrically. This is done by a very specific extrusion process, called twin co-rotating extrusion. When the threads of two screws are rotating together, they force the molecules of the plastic to adhere to themselves in a very precise and uniform manner. Twin counter rotating screws create a different structure to the mix. In addition, a vented two stage screw has a decompression zone, where about two-thirds down the screw, the channel of thread gets deeper, which relieves pressure and allows trapped gases to be drawn out by vacuum. It also has a metering zone with great depth as it serves to repressurize the melt to get it through the resistance of the screen and die. This also controls the temperature, which is important in mixing fillers, especially granulated, pulverized and powdered iron particles. Coextrusion is the extrusion of multiple layers of material simultaneously. This would actually interfere with the monomer placement and even disbursement of fillers. Twin screws are widely used in general compounding with fillers and fibers for homogenous blending. Counter rotating screws move more slowly than co-rotational screws, and are used for pumping more than mixing, which would interfere with the production of magnetic plastic. As a result, co-rotational screws are used in creating that material of the present invention.

The metal or alloy particles in magnetic plastic could be made from a number of combinations, as there are many. The common denominator is the metal or metals need to have magnetic properties. Iron is the cheapest, most abundant, most commonly used, and strongest magnetic metal on Earth. In order for the iron atoms to be locked in a three dimensional tetrahedronal polymer structure, barium or strontium, alloyed together with iron, will assist the atoms to join forces. Strontium and barium are almost identical in elemental terms and both can be used. Strontium is considered cleaner environmentally than barium, so a SrFe alloy can be used in the nylon compound for this reason. These metals are high temperature superconductors and are added to iron to reduce the size of carbon grains within the microstructure. Individually, these metals oxidize rapidly, but partnered with iron and surrounded or encased in an inert environment or polymer such as nylon, they are completely safe from degradation. Barium and strontium alloyed with iron stops the reactions of acid and oxidation, by forming an insoluble barium sulfate on the surface. Barium has low vapor pressure and reactivity towards oxygen, nitrogen, carbon dioxide and water. When dissolved in the crystal lattice, this alloy helps remove noble gases. This alloy is perfect for magnetic plastic, to not only preserve it, but to also aid in its function. Barium is used as a filler in ink, plastics, and rubbers, as a paper coating pigment and in nanoparticles to improve physical properties of polymers. Barium oxide (BaO) coating on the electrodes of fluorescent lamps facilitates the release of electrons. Barium titanate ($BaTiO_3$) is an electroceramic. Ferrite composed of iron oxide ($Fe_2O_3$) and BaO, is electrically nonconductive and ferromagnetic, and can be temporarily or permanently magnetized. This duality allows the electromagnetic induction process to take place within the nylon, yet without the charging particles attracting to themselves and clumping together. This keeps the blend consistently homogenous and evenly magnetized. Both nylon and metal have crystal lattices. This blend of metals allows for the right conditions that make magnetic plastic possible.

In accordance with the process for manufacturing a magnetic plastic material according to the present invention, BaFe particles are mixed with plastic pellets, preferably with the BaFe particles comprising 30-33% by weight of the mixture. The mixture is moved through a feed hopper into a heating barrel. The heating barrel, in one embodiment, may be between 500-525° F. Once liquefied, the plastic is forced through a high pressure screw into the machine tool mold. An anode and a cathode are attached to the machine tool itself, and connected to a low voltage magnetic transformer. Approximately 31 volts are simultaneously being transferred through the entire machine tool, including the semi-viscous or viscous but slowly cooling and hardening plastic. While the plastic is hardening, the poles of the BaFe are locked in place and suspended within the plastic. Once locked in place, there is enough magnetic continuity to allow an arc with a flux to occur. The electrons inside join forces even though locked in place inside the plastic. This way, the plastic can be permanently magnetized later, by approximation to a permanent magnetic coil or super conductor MRI machine generating a high magnetic field, for example. Magnetizing the plastic through an electric current once the particles are locked in place inside the plastic would be impossible, as all the particles would be pointing in random directions and yet are insulated, coated, and surrounded by plastic, preventing the particles from touching each other. Also, since the particles suspended in the hardened plastic would be completely insulated, coated, and surrounded by the plastic, they would be locked in place and could not then be steered or moved. Also, since the particles are suspended in the hardened plastic, they are not touching one another as they do within raw metal. This would not allow a magnetic arc to take place, within the plastic.

In a preferred embodiment of the present invention, the plastic material used is a nylon, because of its commonality among plastic products and additional reasons discussed herein. Other plastic products that could be used include epoxy plastic, polyester plastic, phenolic resins, polyethylene plastic and rubber. If too many BaFe (or SrFe) particles are added to the nylon, it causes the resulting material to lose its lightweight and rigid but flexible nature, and instead becomes heavy and brittle. Thus, there is a fine line to adding a sufficient amount of metal to retain a magnetic field, but not too much to detract from the qualities and characteristics of nylon. Additionally, it is preferred that specific voltage and amperage is briefly turned on during the injection molding process that will allow the poles of the BaFe (or SrFe) particles to align correctly and not cause "clumping" of the particles, which is an attraction of the particles to each other if the electromagnetic current is too long or too strong. In accordance with the present invention, the preferred ratio of plastic to magnetic particles is 67-70% plastic pellets to 30-33% BaFe (or SrFe) particles (by weight), and the voltage is approximately 31 volts, applied for between three and six seconds, which is the duration of the plastic injection. This is a brief window when the plastic is still viscous or semi-viscous and the BaFe (or SrFe) particles can still move inside the rapidly hardening and cooling plastic, and all be aligned in the same direction.

The method of creating the magnetic plastic product of the present invention utilizes a DC power supply. While DC power is not generally used for the transmission of energy from power plants into homes, it is commonly used when distances are small, which is very pertinent to the present invention because the distance inside the injection machine may be only three to five feet in total (i.e., the distance between the transformer and the mold). The reason an AC current is preferably not used in the production method of the present invention is two-pronged. First, an AC current is really two currents, where one is going in one direction and the other is intertwined going the opposite way. The two currents support themselves, giving the other something to hold on to. The two currents then loop back and forth, traveling between the generator and the breaker at the speed of light. For the present invention, this would not work because all the ferrous particles would all be pointing in differing directions, without any continuity. With a DC current, all the particles would go in one direction, allowing magnetic induction to take place later. Additionally, AC is a full current that is either on or off. Regulating the amount and the duration of a current is much easier using a DC current, and applied to a simultaneous, yet separate, motion of plastic being injected into a mold, it is essential. A current going through a mold needs to be able to be precisely timed and controlled, in order to affect the ferrous particles inside the plastic. A standard plastic injection machine is powered by an AC current, but the low voltage variable DC regulator used in the present invention plugs into a standard AC outlet, and then converts the AC current into a DC current. In fact, the term DC is used to refer to power systems that use only one polarity of voltage or current. They are zero-frequency, or a slowly varying local mean value of a voltage or current. Some forms of DC (such as that produced by a voltage regulator) have almost no variations in voltage, but may still have variations in output power and current. If a capacitor or inductor is added to a DC circuit, the resulting circuit is not, strictly speaking, a DC circuit. However, most such circuits have a DC solution. This solution gives the circuit, voltages and currents, when the current is in DC steady state. Such a circuit is represented by a system of differential equations. The solutions to the equations usually contain a time varying or transient part as well as a constant or steady state part. This is how the DC current is controllable and adjustable, compared to the AC current. This is also important in magnetic plastic production as different size products may need a larger magnetic field or higher voltage infusion through a larger injection mold.

In accordance with a first aspect of the invention, a method for making a plastic product having magnetic properties is provided. The method comprises creating a mixture of a nylon and a metal; melting the mixture to create a melted mixture of the metal suspended in the nylon; injecting the melted mixture into a mold to harden the melted mixture and shape the melted mixture; applying an electrical current to the mold while the mixture is in a viscous state to align the poles of the metal suspended in the nylon in the mixture in a single direction before the mixture has hardened; and applying a magnetic field to the hardened mixture to provide the product with magnetic properties.

In accordance with an embodiment of the method of the first aspect of the invention, the nylon in the mixture is in the form of nylon pellets. In various embodiments of the method of the first aspect of the invention, the metal in the mixture is in the form of barium ferrite particles and/or strontium ferrite particles.

In accordance with a further embodiment of the method of the first aspect of the invention, approximately 67-70% by weight of the mixture is the nylon and approximately 30-33% by weight of the mixture is the metal.

In accordance with a further embodiment of the method of the first aspect of the invention, the electrical current applied to the mold is direct current. In accordance with one embodiment of the method, approximately thirty-one volts of direct electrical current is applied to the mold for between three and six seconds In accordance with a further embodiment of the method of the first aspect of the invention, the mixture is heated at a temperature between 500 and 525 degrees Fahrenheit.

In accordance with a further embodiment of the method of the first aspect of the invention, the melted mixture is injected into the mold using co-rotating screws.

In accordance with a further embodiment of the method of the first aspect of the invention, at least one magnet is affixed to an exterior surface of the mold to assist in aligning the poles of the metal suspended in the nylon in the mixture.

In accordance with a further embodiment of the method of the first aspect of the invention, the method is performed at least in part using an apparatus comprising: a hopper configured to receive the mixture of the nylon and the metal; a screw configured to inject the melted mixture into the mold; the mold; and a direct current transformer configured to provide the electrical current applied to the mold.

In accordance with a further embodiment of the method of the first aspect of the invention, applying the magnetic field to the hardened mixture comprises removing the hardened mixture from the mold and applying the magnetic field to the hardened mixture using a pulse charger.

In accordance with a further embodiment of the method of the first aspect of the invention, applying the magnetic field to the hardened mixture comprises removing the hardened mixture from the mold and applying the magnetic field to the hardened mixture using a plurality of N52 magnets.

In accordance with a second aspect of the invention, a plastic product having magnetic properties is provided. The product comprises a mixture comprising a nylon and a metal. The mixture is melted to form a melted mixture of the metal suspended in the nylon and injected into a mold configured to harden the melted mixture and shape the melted mixture. An electrical current is applied to the mold while the mixture is in a viscous state to align the poles of the metal suspended in the nylon in the mixture in a single direction before the mixture has hardened. A magnetic field is applied to the hardened mixture to provide the product with magnetic properties.

In accordance with one embodiment of the product according to the second aspect of the invention, the mixture comprises 67-70% by weight the nylon and 30-33% by weight the metal.

In accordance with a further embodiment of the product according to the second aspect of the invention, the metal is barium ferrite or strontium ferrite.

In accordance with a further embodiment of the product according to the second aspect of the invention, the nylon is nylon 6, nylon 66 or nylon 610.

In accordance with a further embodiment of the product according to the second aspect of the invention, the electrical current applied to the mold is direct current.

In accordance with a further embodiment of the product according to the second aspect of the invention, the magnetic field is applied to the hardened mixture by a pulse charger, a magnetic resonance imaging machine or a plurality of magnets after the hardened mixture has been removed from the mold.

DETAILED DESCRIPTION OF THE INVENTION

The present invention will now be described with reference made to FIGS. 2-9.

Measuring the magnetic strength of something is quantified as a Gauss number. This determines the magnetic grade. A higher number indicates a stronger magnet. The magnetic material inside something qualifies as maximum energy product and is expressed in MGOe (megagauss oersteds) and represents the strongest point which is defined as $BH_{max}$. Another measurement is described as "pull" force which is how much force is exerted to pull a magnet away from something. The pull force is valued with the specific grade labeled as "N" followed by a number.

There is even another measurement to determine the magnetic field of something and where exactly the strongest point is. It is expressed as a Tesla (1 Tesla=10,000 Gauss). The Tesla measurement is for larger magnetic field measurements and Gauss for smaller measurements. This application making guitar picks and other products, particularly small products, would fall into Gauss range of measurement.

However, the Gauss number can be applied to two different measurements. The first is the residual flux density or $B_r$, which is the magnetic induction remaining in a saturated magnetic material after the magnetic field has been removed. So once the material magnetized according to the present invention, it can also be demagnetized to see what residual induction is remaining to define its magnetic properties even more. The second measurement is the "surface field" strength, which is right at the surface of the magnet.

Figure 2:
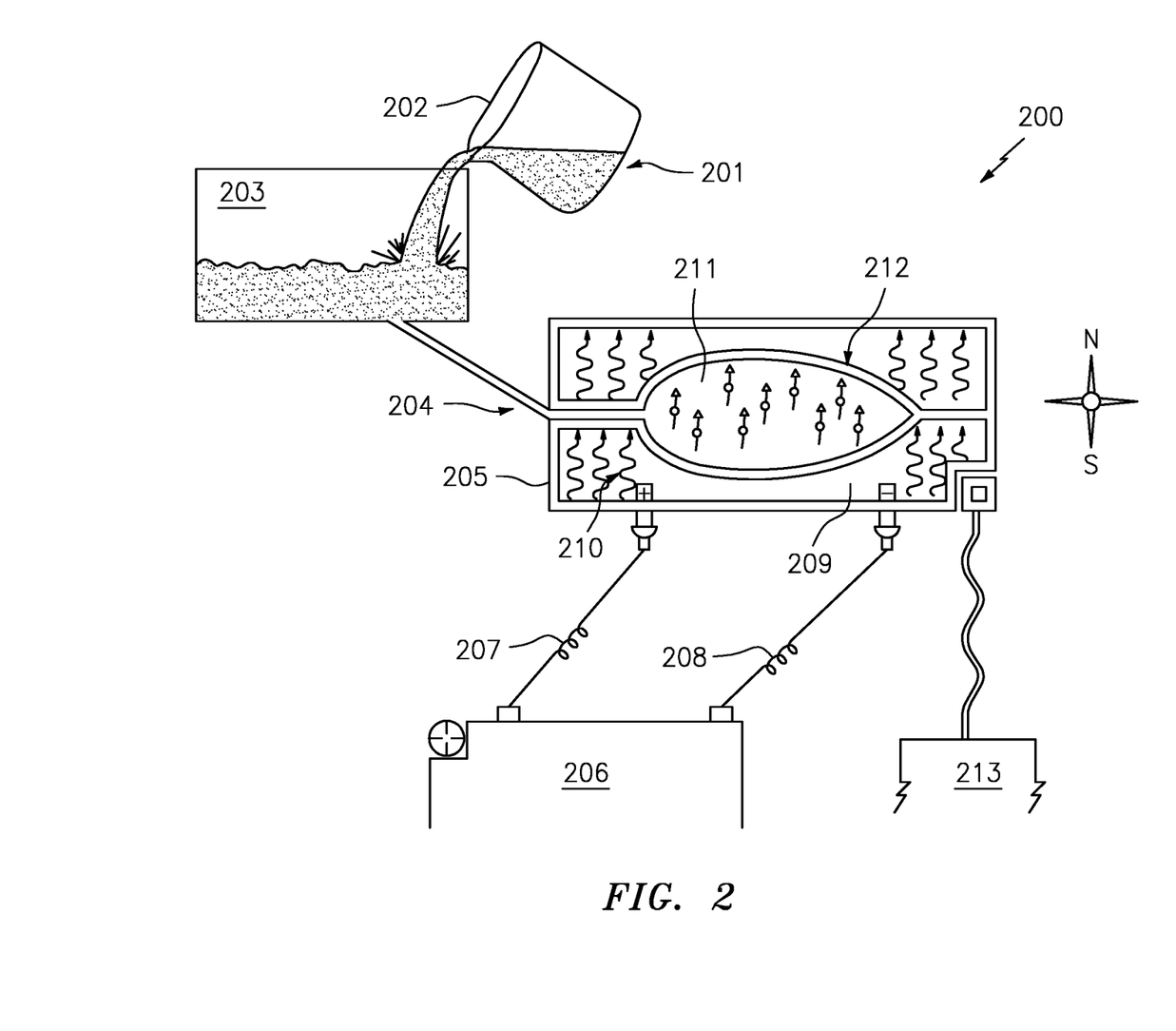
FIG. 2 shows a comprehensive diagram of a process for making a magnetic plastic material in accordance with an embodiment of the present invention.

FIG. 2 illustrates an example of the magnetic plastic induction process 200 according to an embodiment of the invention, which includes: pre-mixed granulated BaFe plastic pellets 201, feed hopper 202, heating barrel 203, ram/screw 204, steel machine tool 205, variable DC transformer 206, anode 207, cathode 208, mold 209, electromagnetic current 210, plastic 211, BaFe particle poles aligned 212, and ground wire 213.

According to one embodiment, the pre-mixed BaFe and plastic pellets 201 used in the invention include extruded nylon plastic pellets and BaFe particles having a size of three microns and tumbled. The plastic pellets and BaFe are combined in a ratio of approximately 67-70% plastic and 30-33% BaFe, by weight. In alternative embodiments, alloys other than BaFe can be utilized, including for example SrFe. Additionally, the alloys used may also include oxygen atoms, such as barium hexaferrite ($BaFe_{12}O_{19}$) or strontium hexaferrite ($SrFe_{12}O_{19}$). Further metal compounds may be used in the present invention that are not expressly listed herein without deviating from the scope of the present invention.

The premixed pellets 201 are provided to a feed hopper 202. The mixture 201 is then provided from the feed hopper 202 to a heating barrel 203, which melts the mixture 201 of nylon pellets and BaFe particles. In one embodiment, the heating barrel 203 may have an internal temperature between 500-525° F. The mixture 201 is liquefied in the heating barrel 203 and transferred to the machine tool 205 by way of a ram/screw 204. In particular, the viscous or semi-viscous mixture is inserted into the mold 209.

A variable or adjustable DC voltage transformer 206 can be utilized, with which one can intermittently or constantly control the amount of electromagnetic current 210 or voltage through the mold 209 inside the machine tool 204 of the injection machine. Alternating current would not work in the method because it alternates directions, as described previously herein. For the present process, direct current is provided flowing in one direction. In one embodiment of the invention, the DC voltage transformer 206 can be a UniSource PS-303D or PS-305D single output DC power supply.

An anode 207 and a cathode 208 are attached to the machine tool 205, and connected to the low voltage transformer 206. An electric current 210 is transferred through the machine tool 205, using the low voltage transformer 206. For example, the low voltage transformer 206 may have a variable range, a range including 31 volts (e.g., a range of 15-40 volts), such that 31 volts, for example, are simultaneously being transferred through the entire machine tool, including the semi-viscous but slowly cooling and hardening plastic 211. While the plastic 211 is hardening within the mold 209, the poles 212 of the BaFe are locked in place and suspended within the plastic 211. Once locked in place, there is enough magnetic continuity to allow a magnetic arc to occur.

Upon completion of the molding process, the molded product can be removed from the machine and can be magnetized. The material can be magnetized using a number of different devices, including for example a pulse charger, an MRI machine or a series of magnets, such as N52 magnets. The device used for magnetizing the material is placed in physical approximation to the material and preferably generates a strong magnetic field, such as a field of approximately one Tesla.

Figure 3:
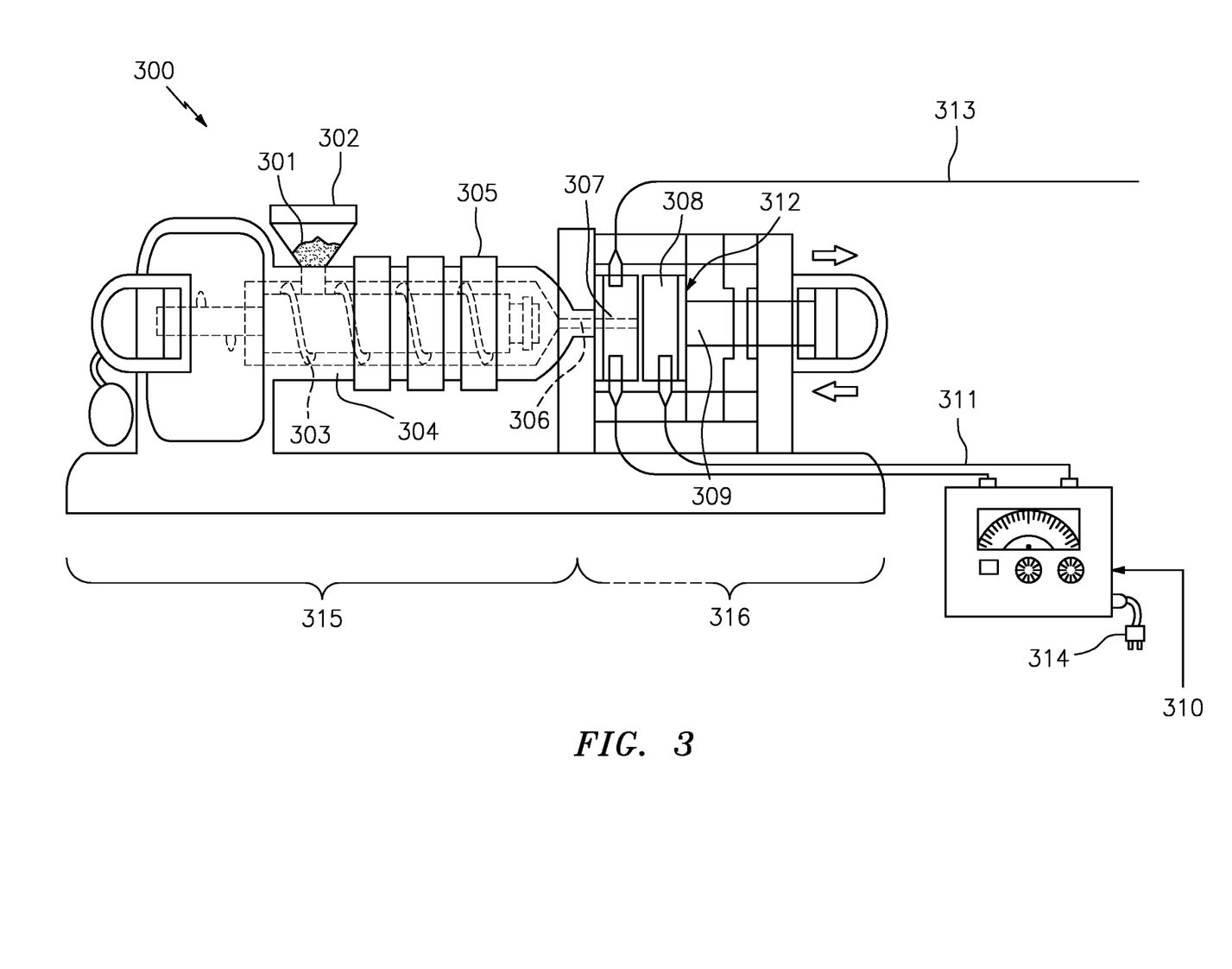
FIG. 3 shows an internal side view of an embodiment of an industrial plastic injection molding machine, used in a process for making a magnetic plastic material in accordance with an embodiment of the present invention.

FIG. 3 shows an internal side view of an industrial plastic injection molding machine 300 for use in the present invention, including the low voltage variable (or current limiting) AC to adjustable DC transformer 310, along with where it attaches to the mold 308 clamped within the hydraulic press of the newly retrofitted machine. There is also a ground wire 313 attaching to the machine 300 itself that limits the current from travelling to other components of the machine 300. Additionally, rubber insulation clamping plates 312 may optionally be provided to further protect the machine 300. The injection molding machine 300 can be further protected from an electrical surge using such non-conductive rubber pads 312.

The injection molding machine 300 includes: a mixture 301 of plastic granules and BaFe/SrFe particles in a hopper 302, reciprocating screw 303, barrel 304, heater 305, nozzle 306, mold cavity 307, mold 308, moveable platen 309, low voltage current limiting AC to adjustable DC transformer 310, connecting wires 311, rubber insulation clamping plate 312, ground wire 313, and AC plug-in 314. An injection section 315 of the injection molding machine 300 comprises the hopper 302, reciprocating screw 303, barrel 304, heater 305 and nozzle 306. A clamping section 316 of the injection molding machine 300 comprises the mold cavity 307, mold 308, moveable platen 309 and rubber insulation clamping plate 312. The low voltage DC current limiting AC to adjustable DC transformer section of the injection molding machine 300 comprises the DC transformer 310, connecting wires 311 and ground wire 313.

Figure 4:
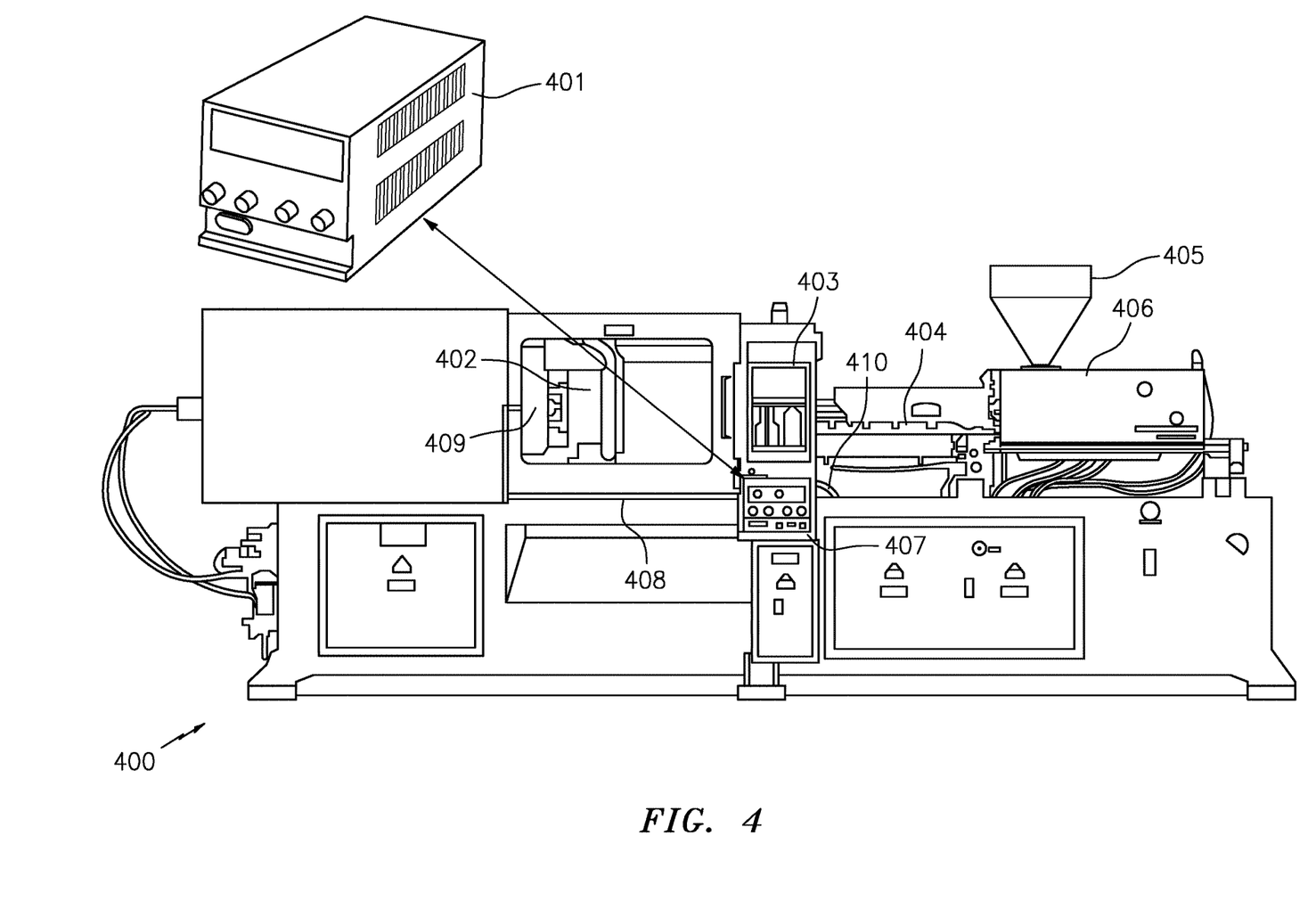
FIG. 4 shows a further embodiment of an industrial plastic injection molding machine, used in a process for making a magnetic plastic material in accordance with an embodiment of the present invention.

FIG. 4 illustrates an additional example of an injection molding machine 400 that can be used in the process of making magnetic plastic materials in an embodiment of the present invention. The machine 400 includes a DC transformer 401, hydraulic platen 402, digital control panel 403, screw 404, hopper 405, heating barrel 406, a control panel interface 407 flush with the inserted variable DC transformer 401, a cable 408 connecting to injection mold 409 and additional wiring 410.

Figure 5:
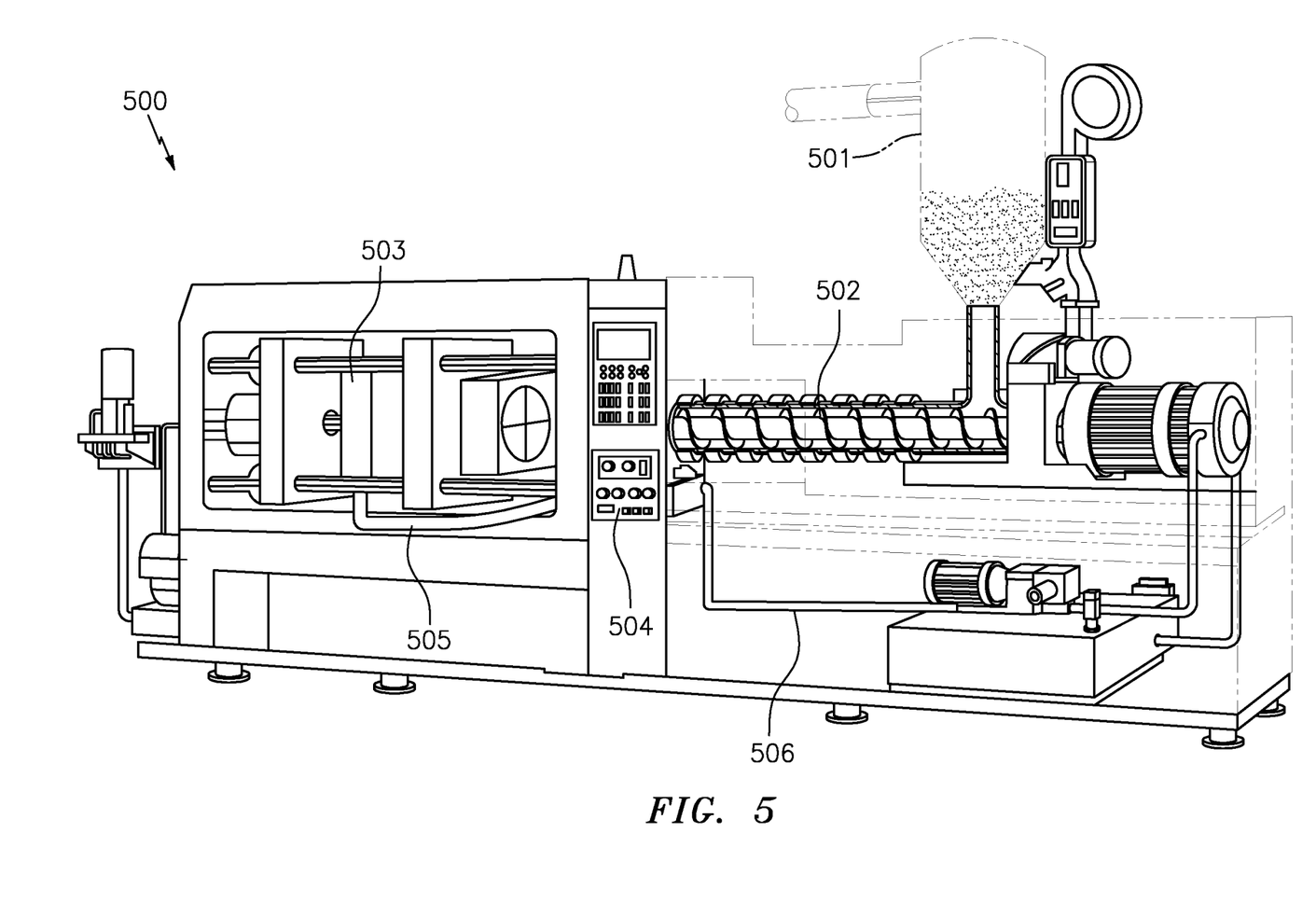
FIG. 5 shows a further embodiment of an industrial plastic injection molding machine, used in a process for making a magnetic plastic material in accordance with an embodiment of the present invention.

FIG. 5 illustrates a further additional example of a plastic injection molding machine 500 that can be used in the process of making magnetic plastic materials in an embodiment of the present invention. The machine 500 includes a hopper 501, screw 502, a mold 503, an inserted variable DC transformer 504, a cable 505 connecting the transformer 504 to the mold 503 and a cable 506 connecting the transformer 504 to a power supply. No ground wire may be needed in this embodiment of the machine 500, as the machine 500 grounds to self. The transformer 504 may be flush to a control panel interface.

The size of the ferrous particles inside the nylon or other polymer can vary from 1.5 to 30 microns. It is important to factor in the potential danger and damage to the operator running the machine, the injectors and the injector machine as a whole. The clogging from residual buildup and/or the abrasion of the injectors are serious concerns. If the particles are too big to be forced through a small tip on an injection nozzle, then molten plastic at high pressure would or could be misdirected, creating serious and dangerous consequences to the operator and/or the injection machine. The solution is to fit the injection machine with the suitable nozzle size for the specific project. Nozzle tips are interchangeable on all injection machines, and there are many different types and orifice sizes to the nozzle tips. Tips having wider openings would be used if larger plastic particles are used.

Figure 6A:
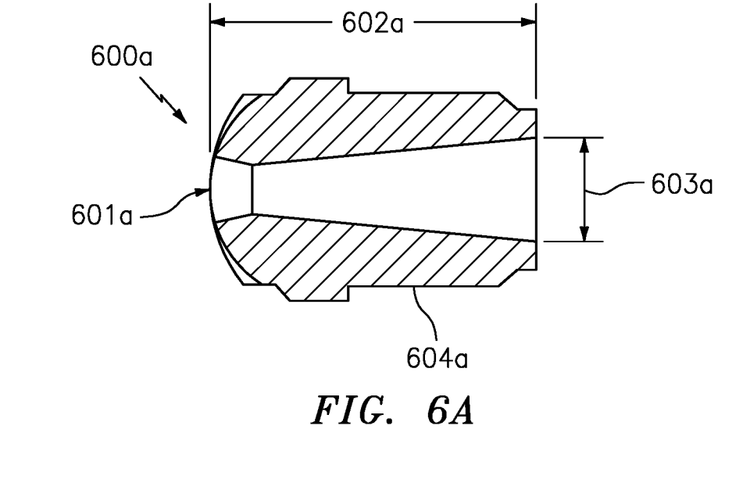
FIGS. 6A-6C show various embodiments of injection nozzles utilized in an industrial plastic injection molding machines used in various embodiments of the present invention.
Figure 6B:
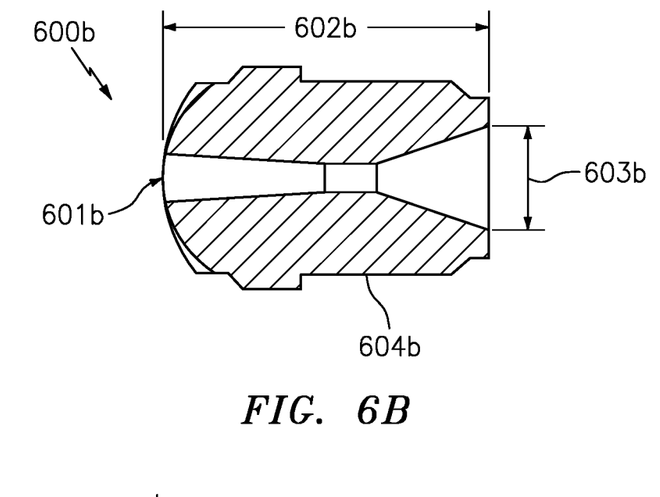
Figure 6C:
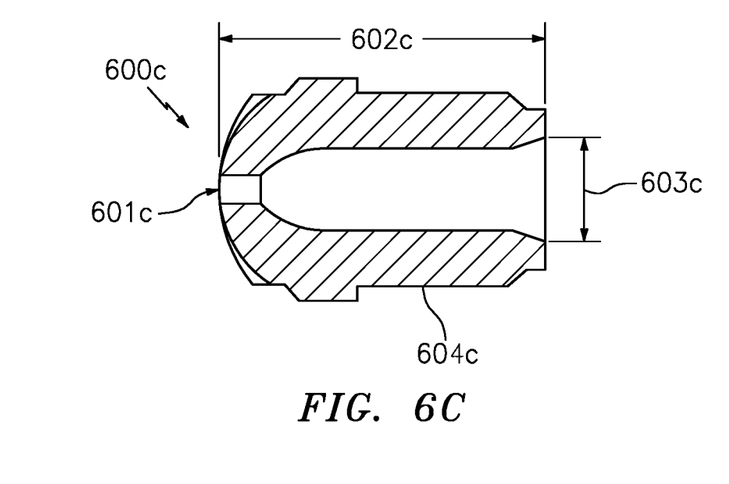

Examples of several injection nozzle tips are illustrated in FIGS. 6A, 6B and 6C. FIG. 6A illustrates a full taper injection nozzle 600a. FIG. 6B illustrates a nylon injection nozzle 600b. FIG. 6C illustrates a general purpose injection nozzle 600c. The injection nozzles 600a, 600b, 600c may have varying orifice sizes depending on the size of the particles being injected. The radii 601a, 601b, 601c of the injection nozzles 600a, 600b, 600c may be between ½" and ¾". The injection nozzles 600a, 600b, 600c may have lengths 602a, 602b, 602c of 1.5 inches and rear openings 603a, 603b, 603c of ½". The injection nozzles 600a, 600b, 600c preferably including threading 604a, 604b, 604c to permit easy attachment and detachment.

Figure 7A:
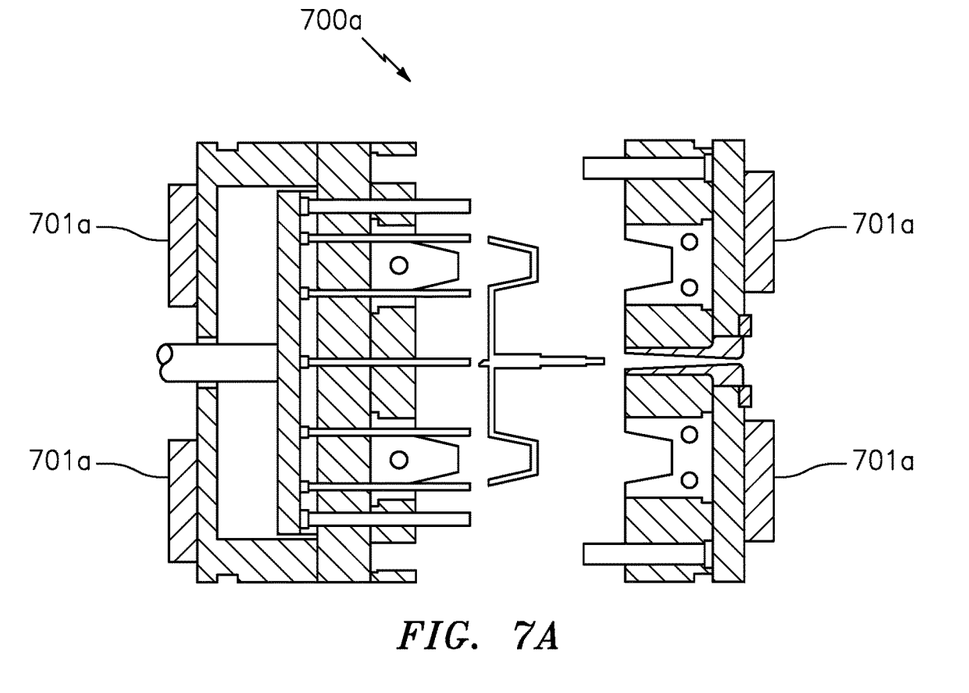
FIGS. 7A and 7B show various embodiments of an injection mold having magnets attached to the exterior of the mold, to assist in a process for making a magnetic plastic material in accordance with an embodiment of the present invention.
Figure 7B:
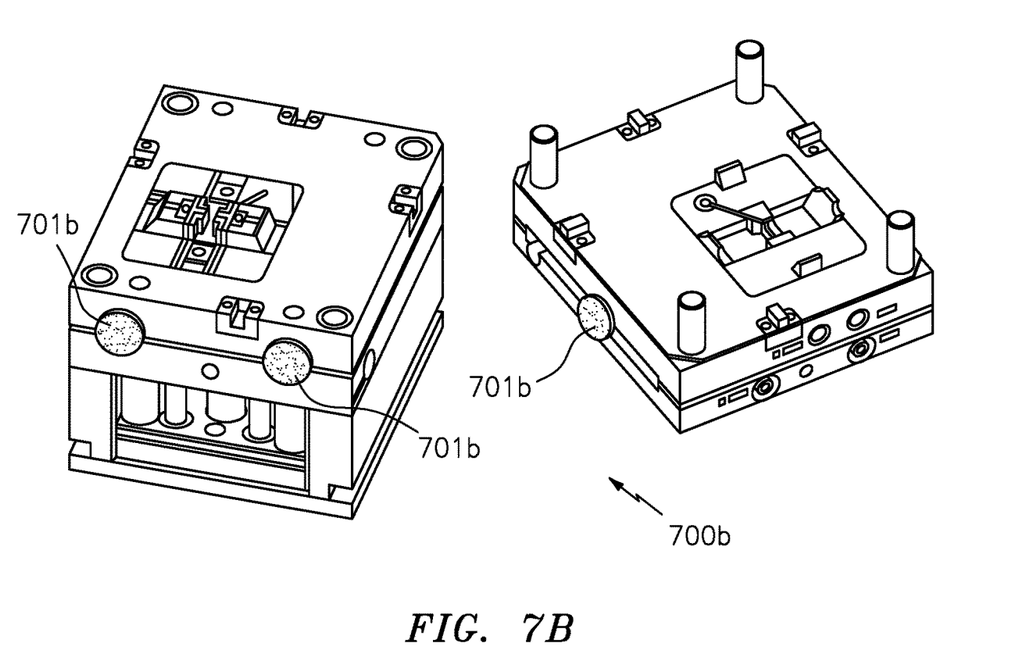

In certain embodiments of the invention, illustrated in FIGS. 7A and 7B for example, the injection molds 700a, 700b, can be outfitted with magnets 701a, 701b on the exterior surface of the injection molds 700a, 700b. The magnets 701a, 701b can include, for example, N52 magnets. If needed, adding N52 magnets 701a, 701b to the outside or edges of the mold 700a, 700b increases the magnetic "load" assisting a larger magnetic field that is created during electromagnetic induction process of the present invention. N52 magnets are some of the most powerful magnets on the Earth. The N stands for neodymium and 52 is numerical reference to its strength. Approximately one Tesla of magnetic load may be required to charge or magnetize the finished plastic product. A pulse charger or magnetic coil, for example, can generate approximately one Tesla.

Molds can be quite complex on the inside, but are generally very flat on the outside so they can fit in between the platen and hydraulic pistons of the injection molding machine forcing them together. This is done for stability. If the ferrous particles, or magnetic filler material inside the polymer being used are too big, and/or the mold itself is relatively large, powerful N52 magnets can be placed on the flat side or edges of the mold to assist in the electromagnetic induction process. This will help the DC current steer the ferrous particles in one direction. The N52 magnets 701a, 701b are placed on the flat side or edges of the molds 700a, 700b so as not to get in the way of the platen and are positioned accordingly, as each mold has a different shape.

Figure 8A:
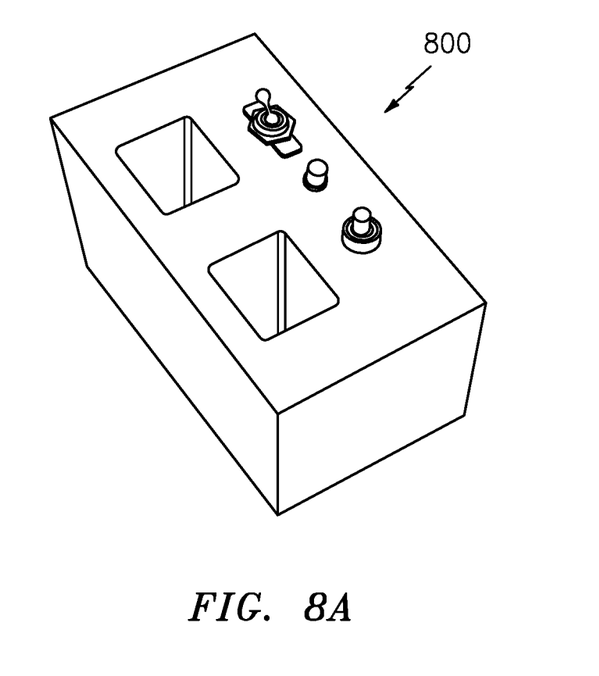
FIG. 8A shows a pulse charger used in a process for making a magnetic plastic material in accordance with an embodiment of the present invention.
Figure 8B:
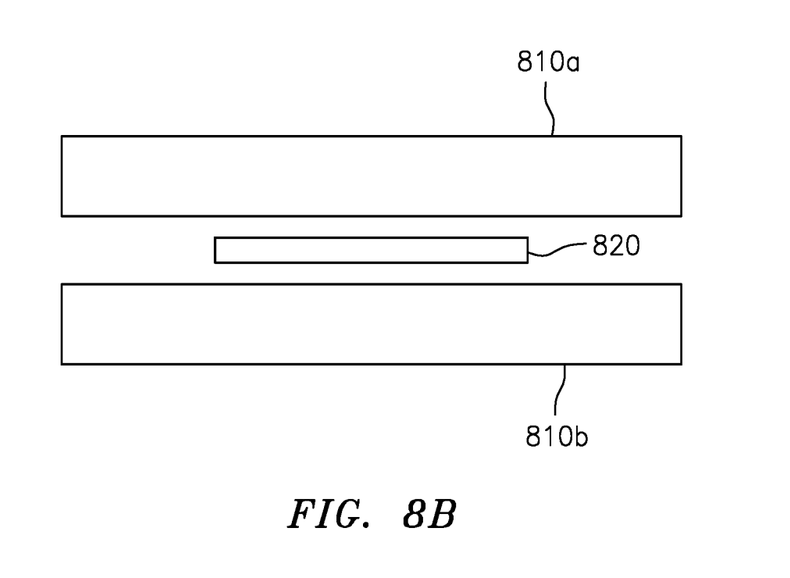
FIG. 8B shows a series of magnets in a process for making a magnetic plastic material in accordance with an embodiment of the present invention.

Upon completion of the molding process, the molded product can be removed from the machine and can be magnetized. The material can be magnetized using a number of different devices, including for example a pulse charger, an Mill machine, a series of magnets, such as N52 magnets, and any other devices with a magnetic load. FIG. 8A illustrates an example of a pulse charger 800 that can be used in the present invention to magnetize the molded product. FIG. 8B illustrates an example of an arrangement of magnets 810a and 810b that can alternatively be used to magnetize a molded product 820 in accordance with an alternative embodiment of the present invention. The magnets 810a and 810b may be powerful magnets, such as N52 magnets, and each magnet 810a and 810b may comprise several magnets, including for example six magnets, attached together. Each of the magnets 810a and 810b may have an attached handle (not shown) to aid in manipulating the magnets 810a and 810b. The product 820 removed from the mold, or a plurality of such products, can be placed in between the two magnets 810a and 810b, which are separated by a short distance. Within a short period of time, such as one second or less, the product 820 is magnetized by the magnetic field generated by the magnets 810a, 810b, and can be removed.

Figure 9:
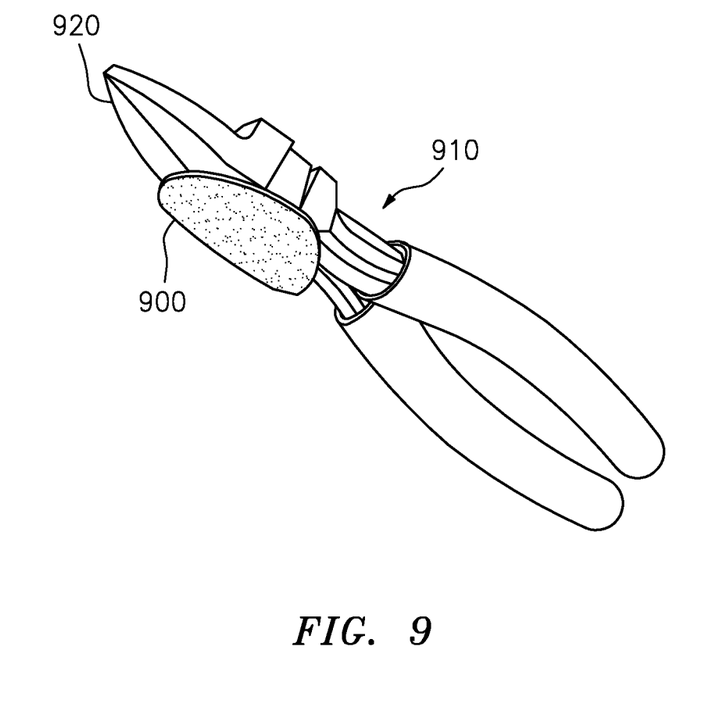
FIG. 9 shows an example of the magnetic plastic material created in accordance with the present invention.

FIG. 9 illustrates a sample of a guitar pick made using the process of magnetic plastic induction according to the present invention. In FIG. 9, the guitar pick 900 is magnetically attracted to a metallic object 920, which in the example illustration is the metallic portion 920 of a set of pliers 910. The prior art sample shown in FIG. 1 is clunky, heavy, dense, and brittle. In contrast, the material 900 shown in FIG. 9 is lightweight. Also, the sample 900 in FIG. 9 shows the difference between a fully magnetic product and partially magnetic material, as in FIG. 1. The sample in FIG. 1 includes an inner coupling cylinder with a groove notched on one end. If you place the other end on the permanent rare earth magnet also included, you will notice there is no magnetic repulsion, only attraction. If one takes the sample of the guitar pick 900 of FIG. 9 and place both sides on the magnet, you will see both attraction and repulsion. This proves the BH Curve is constant through the whole sample, not just one end.

For guitar picks in accordance with the present invention, the mixture of nylon and BaFe can melt in the heating barrel within several minutes. The material is injected for 0.5 seconds at 700 psi with a 2.0 second "hold time" at 400 psi and another 8 seconds of "cooling time." The product is ejected from the mold by being forced or pushed out of the mold by an internal pin that runs through the mold. The entire time from injection to ejection can be a cycle of approximately 15 seconds, including 3-6 seconds for the induction and the cooling time to harden properly before ejection. As the plastic might be solid at the end of the 6 seconds, it is still somewhat pliable, and the ejector pin could scar or indent the product.

Table 1 shows nine samples of manufacturing a material as described previously, starting with the highest voltage and longest duration that the machinery used allows. For each sample, a Gauss number was determined in relation to the length and voltage of a DC current through an injection mold. The plastic samples were then placed next to a magnetic coil to increase its Gauss number from the DC transformer. A ground wire was connected to the injection machine and the machine was separately grounded.

TABLE 1

Plastic Injection Molding with Barium Ferrite Electromagnetic Induction Tests

| Sample | Duration of Induction (in seconds) | Voltage/Current |
|---|---|---|
| 1 | 6.00 | 31 V/0.28 amps |
| 2 | 3.00 | 31 V/0.28 amps |
| 3 | 2.50 | 31 V/0.28 amps |
| 4 | 2.00 | 15 V/0.13 amps |
| 5 | 1.75 | 15 V/0.28 amps |
| 6 | 1.50 | 15 V/0.28 amps |
| 7 | 1.00 | 31 V/0.28 amps |
| 8 | 0.50 | 31 V/0.28 amps |
| 9 | 0.25 | 31 V/0.28 amps |

On the first sample, 31 volts and 0.28 amps were run through the machine mold in the injection machine for a period of 6 seconds, which is the entire time that the plastic is purged through the screw into the mold and then hardened. On the second sample, 31 volts and 0.28 amps were run through the machine mold in the injection machine for a period of 3 seconds. The resulting Gauss number for the material after application of 31 volts to the mold for a period of 3-6 seconds may typically be between N8 and N12, although this number may vary based on other factors such as the type and amount of filler.

Tests were continued to see where the current becomes too weak to align the poles of the BaFe particles. When the voltage was cut in half to 15 volts, it resulted in serious effects of no magnetic arc. There was some very slight magnetic pull, but not to defy gravity. The Gauss number would be less than the Gauss number from the first test at 31 volts. Tests were continued, cutting the duration to shorter time periods, until no magnetic arc was found and MGOe had reduced to zero. A test sample was also run with no current running through the tool. To dispel any doubt that a sample could be magnetized without the induction process, the sample was then placed next to the magnetic coil and it did not maintain an arc.

There are many applications in which "magnetic plastic" could be used, examples of which are described herein.

Mag-Lev trains will be the way people travel globally upon the Earth in the future. In fact, we already do, but it will become a global phenomenon. As this technology advances and becomes quicker and lighter, "magnetic plastic" can be used in the construction of Mag-Lev trains. If automobiles had bumpers that were magnetized with the same poles, they would not be immune from accidents, but they could repel themselves and minimize severe impacts. The same principle could be applied to football helmets in reducing severe head injury.

Attracting plastic to itself and metal has endless benefits, from sorting recycled plastic to lightweight space tools that could attach themselves without tethers to a spacecraft. Components in machine design and mechanical engineering using "magnetic plastic" would revolutionize the industry. Production would be faster, easier and more cost efficient. Creating an endless energy supply would not just require the forces of nature anymore. Wind, solar and hydro-energy all require certain and specific conditions. Giant "magnetic plastic" turbines could lay flat on the Earth, or even under, it, and protected from the elements. Two giant "magnetic plastic" propellers clamped together, and with the same magnetic flux, would repel around and around indefinitely, generating endless energy. The gravity inflicted on metal components would create friction and drag and not power a turbine. "Magnetic plastic" would have the same magnetic arc as metal but not the same weight or resistance, meaning it would be much faster, generating much more energy.

"Magnetic plastic" could also be used in attaching lids to bottles, thereby eliminating threads so things don't need to be screwed together, or bottles could attach to holders in cars. Toys made from "magnetic plastic" would make them interactive and interchangeable. Poker chips can be made from the material, which would stick together and be easily stacked and easily pulled apart. Prosthetic limbs could have magnetic attraction helping secure themselves to the body. There would be additional advancements in the medical field, as pins, bolts and sutures inside the body that had an electromagnetic current through them would not only be lightweight and stay in place, but would also assist in circulation in the body and minimize clotting. Airplanes are most vulnerable when they take off and when they land. Switching from rubber tires to "magnetic plastic" coupling and repulsion tracks on runways would make flying exponentially more safe. Objects that are attached, screwed, nailed, glued, clipped or wedged together would now simply be attracted to themselves. Cooking utensils in high volume restaurants could be stuck to the wall and not in drawers. Baby high chairs could be made of "magnetic plastic" reducing fumbles and spills of plates, cups and spoons. Sippy cups can be stuck to the refrigerator when the child is done and too small to place it in the sink.

Magnetizing plastic materials such as nylon could also have benefits in recycling, simply in the collection and the sorting process. Most nylons reach the garbage dumps, decaying very slowly. Nylons are robust polymers and lend well to recycling. Nylons are generally added directly in a closed loop at the injection machine, where grinding sprues and runners are then added to the virgin pellets. Yet, at certain plants they are extruded all over again to find new life. Discarded plastic products would attract to themselves in the wild and in the oceans, magnetic plastic products would group themselves together, aiding in its recycling.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice.

What is claimed:

1. A method for making a plastic product having magnetic properties, comprising:
   providing a plurality of pre-mixed pellets, each of the pellets comprising a combination of nylon and ferromagnetic alloy particles, wherein the nylon comprises one or more of nylon 6 or nylon 66 and the ferromagnetic alloy particles comprise one or more of BaFe or SrFe;
   melting the pre-mixed pellets to create a melted mixture of the ferromagnetic alloy particles suspended in the nylon;
   injecting the melted mixture into a mold and concurrently applying a direct electrical current to an outer surface of the mold by way of a direct current transformer while the mixture is in a viscous state so as to align the poles and join forces of electrons of the ferromagnetic alloy particles, and to steer the ferromagnetic alloy particles suspended in the nylon in the mixture in a single direction while the mixture is hardening and cooling;
   and
   removing the hardened injection molded article from the mold and applying a further magnetic field to the hardened injection molded article so as to magnetize the article.

2. The method according to claim 1, wherein each of the pre-mixed pellets comprises approximately 67-70% by weight of the nylon and approximately 30-33% by weight of the ferromagnetic alloy particles.

3. The method according to claim 1, wherein approximately thirty-one volts of direct electrical current is applied to the mold for between three and six seconds.

4. The method according to claim 1, wherein the pre-mixed pellets are heated at a temperature between 500 and 525 degrees Fahrenheit.

5. The method according to claim 1, wherein the melted mixture is injected into the mold using co-rotating screws.

6. The method according to claim 1, wherein the method is performed at least in part using an apparatus comprising:
   a hopper configured to receive the pre-mixed pellets;
   a screw configured to inject the melted mixture into the mold;
   the mold; and
   the direct current transformer configured to provide the electrical current applied to the mold.

7. The method according to claim 1, wherein applying the further magnetic field to the hardened injection molded article comprises removing the hardened mixture from the mold and applying the further magnetic field using a pulse charger.

8. The method according to claim 1, wherein applying the further magnetic field to the hardened injection molded article comprises removing the hardened mixture from the mold and applying the further magnetic field comprises using a plurality of N52 magnets.

9. The method according to claim 1, wherein the direct electrical current is applied to the mold for between three and six seconds.

10. The method according to claim 9, further comprising removing the hardened mixture from the mold after applying direct electrical current to the mold, and applying the magnetic field to the hardened mixture.

11. The method according to claim 1, wherein melting the pre-mixed pellets comprises heating the pre-mixed pellets in a barrel at a temperature between 500 and 525 degrees Fahrenheit;

wherein applying a direct electrical current to the mold comprises applying thirty-one volts of direct electrical current to the mold for between three and six seconds; and     wherein applying a magnetic field to the hardened mixture comprises removing the hardened mixture from the mold and magnetizing the hardened mixture using a magnetizing device.

12. The method according to claim 1, wherein the ferromagnetic alloy particles are is homogenously and symmetrically suspended in the nylon in the melted mixture and in the hardened injection molded article, and the hardened injection molded article is evenly magnetized.

* * * * *